United States Patent
Yuan et al.

(10) Patent No.: US 12,395,922 B2
(45) Date of Patent: Aug. 19, 2025

(54) METHOD AND DEVICE FOR ENABLING ACCESS TO WIRELESS COMMUNICATION NETWORK

(71) Applicant: ZTE CORPORATION, Guangdong (CN)

(72) Inventors: Zhifeng Yuan, Guangdong (CN); Yuzhou Hu, Guangdong (CN); Guanghui Yu, Guangdong (CN); Shuqiang Xia, Guangdong (CN); Liujun Hu, Guangdong (CN); Weimin Li, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 404 days.

(21) Appl. No.: 17/966,321

(22) Filed: Oct. 14, 2022

(65) Prior Publication Data
US 2023/0032127 A1 Feb. 2, 2023

Related U.S. Application Data

(63) Continuation of application No. PCT/CN2020/085313, filed on Apr. 17, 2020.

(51) Int. Cl.
*H04W 48/10* (2009.01)

(52) U.S. Cl.
CPC .................. *H04W 48/10* (2013.01)

(58) Field of Classification Search
None
See application file for complete search history.

(56) References Cited

U.S. PATENT DOCUMENTS

| 2014/0204850 A1* | 7/2014 | Kim | H04W 48/10 370/329 |
| 2017/0150419 A1* | 5/2017 | Li | H04W 48/10 |

(Continued)

FOREIGN PATENT DOCUMENTS

| CN | 103686934 | 3/2014 |
| CN | 105745852 A | 7/2016 |

(Continued)

OTHER PUBLICATIONS

Written Opinion of the International Searching Authority and International Search Report issued Jan. 20, 2021 in International (PCT) Application No. PCT/CN2020/085313.

(Continued)

*Primary Examiner* — Hong S Cho
(74) *Attorney, Agent, or Firm* — Crowell & Moring LLP

(57) ABSTRACT

This disclosure relates to methods and devices for enabling access to a cell-free wireless communication network. The cell-free wireless communication network may include a plurality of access points and at least one central processing unit controlling the access points. In one implementation, the method may include obtaining an access assisting signal in an access assisting signal set. The access assisting signal set may include a plurality of access assisting signals that enable a user equipment to initially access to the cell-free wireless communication network. The method may include broadcasting the access assisting signal. The plurality of access points broadcast respective access assisting signals at a same time.

19 Claims, 4 Drawing Sheets

(56) References Cited

U.S. PATENT DOCUMENTS

2017/0347387 A1\* 11/2017 Dunsbergen .......... H04W 76/15
2019/0313260 A1   10/2019 Zhang et al.
2021/0344389 A1\* 11/2021 Frenger ................ H04L 5/0048

FOREIGN PATENT DOCUMENTS

| CN | 106899971 A     | 6/2017 |
| CN | 107005922       | 8/2017 |
| CN | 107925605       | 4/2018 |
| WO | WO 2014/056173 A1 | 4/2014 |

OTHER PUBLICATIONS

Marcus Karlsson et al. "Techniques for System Information Broadcast in Cell-Free Massive MIMO" IEEE Transactions on Communications, vol. 67, No. 1, Jan. 31, 2019 (Jan. 31, 2019), pp. 244-254.
Karlsson et al. "Techniques for System Information Broadcast in Cell-Free Massive MIMO," IEEE Transactions on Communications, January 2019, 67(1):244-257.
Interdonato et al., "Ubiquitous Cell-Free Massive MIMO Communications," Arxiv.org, Oct. 2018, 19 pages.
Office action issued in Chinese application No. 202080099745.1, dated Dec. 28, 2024, 9 pages (with English translation).

\* cited by examiner

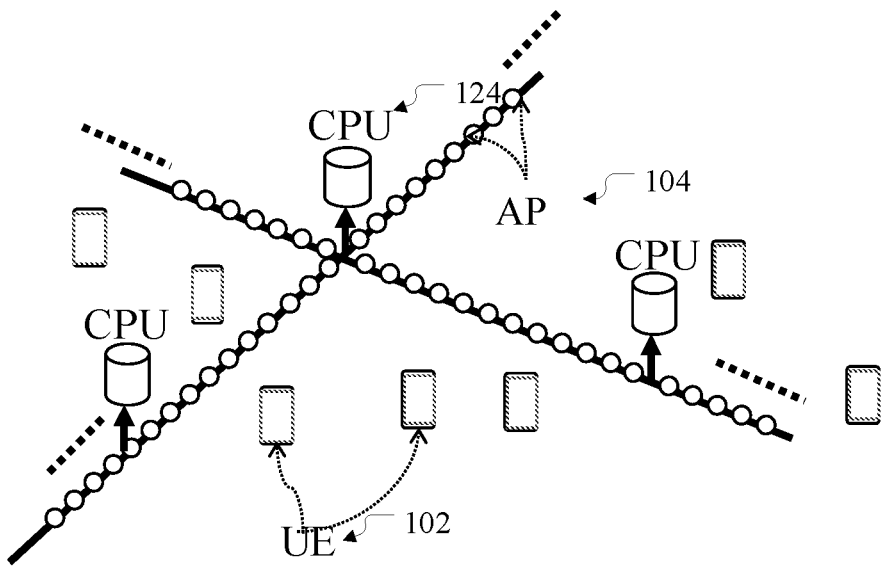

Obtaining an access assisting signal in an access assisting signal set, the access assisting signal set comprises a plurality of access assisting signals that enable a user equipment to initially access to the cell-free wireless communication network
210

Broadcasting the access assisting signal, the plurality of access points broadcast respective access assisting signals at a same time
220

FIG. 2

METHOD AND DEVICE FOR ENABLING ACCESS TO WIRELESS COMMUNICATION NETWORK

This application is a continuation application of PCT International Application No. PCT/CN2020/085313, filed with the China National Intellectual Property Administration, PRC on Apr. 17, 2020, which is herein incorporated by reference in its entirety.

TECHNICAL FIELD

This disclosure is directed generally to wireless communications and particularly to enable initial access to a cell-free wireless communication network.

BACKGROUND

To enable a user equipment (UE) to accomplish initial access to traditional cellular systems, a base station may periodically broadcast a type of signals which is referred to as downlink synchronize signal. The UE may search such type of signals to accomplish cell search and synchronization.

To ensure the UE to receive the downlink synchronize signals, the base station may improve the transmission power of the downlink synchronization signals. A user equipment at cell edge may receive weak downlink synchronization signals with large path loss due to the long distance from the base station. However, the system is designed to warrant that cell-edge UEs can receive the broadcast synchronization signals correctly. Typical methods are to improve the power of the broadcast signals such that the signals has sufficient signal strength when they arrive at the cell-edge user equipments.

However, the initial access method in the traditional cellular system is not applicable to a cell-free wireless communication system. Because of significant architecture differences between the traditional cellular system and the cell-free system, merely improving power of the broadcast synchronization signals fails to guarantee that all user equipments within the coverage of the cell-free system are able to receive the signals.

SUMMARY

This disclosure is directed to methods, systems, and devices related to wireless communication, and more specifically, to initially access a cell-free wireless communication network.

In one embodiment, a method performed by an access point in a cell-free wireless communication network is disclosed. The cell-free wireless communication network may comprise a plurality of access points and at least one central processing unit controlling the access points. The method may include obtaining an access assisting signal in an access assisting signal set. The access assisting signal set may include a plurality of access assisting signals that enable a user equipment to initially access to the cell-free wireless communication network. The method may include broadcasting the access assisting signal. The plurality of access points broadcast respective access assisting signals at a same time.

In another embodiment, a device for wireless communication may include a memory storing instructions and a processing circuitry in communication with the memory. When the processing circuitry executes the instructions, the processing circuitry is configured to carry out the above methods.

In another embodiment, a computer-readable medium comprising instructions which, when executed by a computer, cause the computer to carry out the above methods.

The above and other aspects and their implementations are described in greater detail in the drawings, the descriptions, and the claims below.

BRIEF DESCRIPTION OF THE DRAWINGS

FIG. 1A-1B illustrate example diagrams of a cell-free wireless communication network in accordance with various embodiments.

FIG. 2 illustrates a flow diagram of a method for enabling access to the cell-free wireless communication network in accordance with an embodiment.

DETAILED DESCRIPTION

The technology and examples of implementations and/or embodiments in this disclosure can be used to improve performance in wireless communication systems. The term "exemplary" is used to mean "an example of" and unless otherwise stated, does not imply an ideal or preferred example, implementation, or embodiment. Section headers are used in the present disclosure to facilitate understanding and do not limit the disclosed technology in the sections only to the corresponding section. Please note that the implementations may, however, be embodied in a variety of different forms and, therefore, the covered or claimed subject matter is intended to be construed as not being limited to any of the embodiments to be set forth below. Please also note that the implementations may be embodied as methods, devices, components, or systems. Accordingly, embodiments of this disclosure may, for example, take the form of hardware, software, firmware or any combination thereof.

Figure 1A:
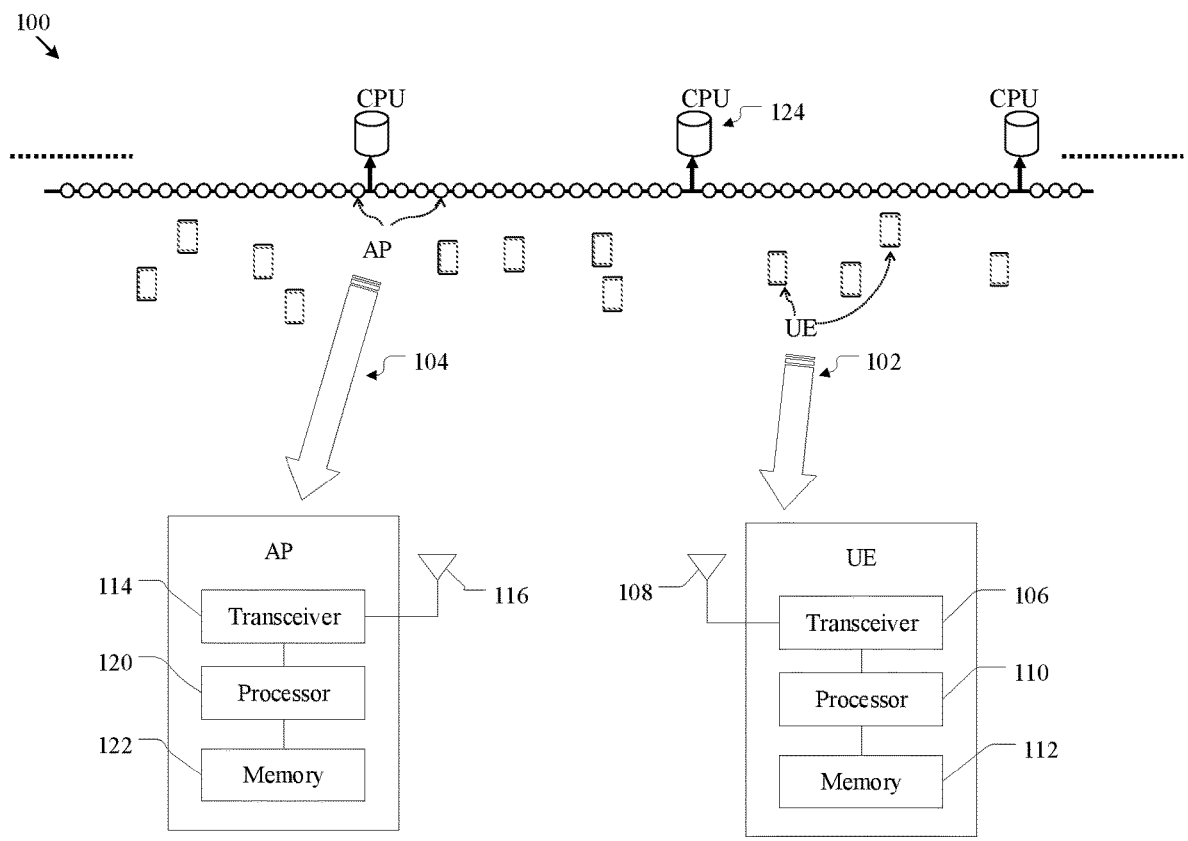

A cell-free wireless access network provides network connectivity between a user equipment and an information or data network such as a text, voice or video communication network, the Internet, and the like. Typically, the cell-free wireless access network may include a plurality of densely deployed access points (APs) and at least one central processing unit (CPU) controlling the access points. A UE may access the cell-free wireless access network via any of the APs. FIG. 1A shows an example system diagram of cell-free wireless communication network 100 including UEs 102, access points 104, CPUs 124 according to various embodiments. The APs 104 are densely deployed in the cell-free network 100. The APs 104 may wired or wirelessly connect with the CPUs 124 to form a chain network as shown in FIG. 1A. Alternatively or additionally, the APs 104 in the cell-free network 100 may wired or wirelessly connect with the CPUs 124 in other topology ways, for example, to form a star network as shown in FIG. 1B or mesh network. Each of the CPUs 124 may control one or more APs 104 and manage the communication of the APs 104 with the UEs 102 and upper level network nodes of the cell-free network 100 such as macro base stations. In some implementations, the CPU 124 may be deployed in a macro base station.

The APs 104 may include various wireless network access points capable of communicating wirelessly over a network with one or more UEs. Each type of these APs may be configured to perform a corresponding set of wireless network functions. The set of wireless network functions between different types of access points may not be identical. The set of wireless network functions between different types of access points, however, may functionally overlap. The APs 104 may include transceiver circuitry 114 coupled to an antenna 116, which may include an antenna 118 in various approaches, to effect wireless communication with the UEs 102. The transceiver circuitry 114 may also be coupled to one or more processors 120, which may also be coupled to a memory 122 or other storage devices. The memory 122 may store therein instructions or code that, when read and executed by the processor 120, cause the processor 120 to implement various ones of the methods described herein.

The UEs 102 may include but is not limited to a mobile phone, smartphone, tablet, laptop computer, a vehicle on-board communication equipment, roadside communication equipment, a smart electronics or appliance including an air conditioner, a television, a refrigerator, an oven, or other devices that are capable of communicating wirelessly over a network. The UEs 102 may include transceiver circuitry 106 coupled to an antenna 108 to effect wireless communication with the access point 104. The transceiver circuitry 106 may also be coupled to a processor 110, which may also be coupled to a memory 112 or other storage devices. The memory 112 may store therein instructions or code that, when read and executed by the processor 110, cause the processor 110 to implement various ones of the methods described herein.

Besides UEs, APs and CPUs, the network 100 may further comprise any other network nodes with different functions such as the network nodes in core network of the wireless communication network 100. In addition, while various embodiments will be discussed in the context of the particular example wireless communication network 100, the underlying principle applies to other applicable wireless communication networks.

The cell-free network 100 transmits/receives wireless signal to/from UEs 102 through the APs 104. As illustrated in FIG. 1A, when the cell-free network 100 transmits data traffic to a UE 102, i.e., a downlink data transmission, a CPU 124 may transmit the data traffic to the APs 104 being capable of communicating with the UE 102, for example, the APs 104 surrounding the UE 102, and then the APs 104 may transmit to the UE 102 a wireless signal carrying the data traffic. These APs 104 may transmit the same data traffic to the UE 102 but using different wireless signals to carry the data traffic. In the data transmission stage, it is supposed that the APs have knowledge of the condition of channels between the UEs and the APs. Therefore, the APs may generate wireless signals based on the known channel conditions. In particular, the APs may adjust the amplitude and phase of a wireless signal s carrying the data traffic such that the wireless signals transmitted from different APs may be combined constructively. For example, if $AP_n$ knows that the gains of the channel between the $AP_n$ and a $UE_k$ is $h_{nk}$, the $AP_n$ may transmit a signal $s_n$, where $s_n = h_{nk}^* s$. As such, the signal that the $UE_k$ receives from the $AP_n$ is $h_{nk} s_n = h_{nk} h_{nk}^* s = |h_{nk}|^2 s$, and the superimposed signals that the $UE_k$ receives from multiple APs (e.g. N APs) will be $$\sum_{n=0}^{N-1} |h_{nk}|^2 s.$$

As indicated, the superimposed signals are combined constructively, which is also called transmit beamforming. More accurately, these distributed APs transmit data to the UEs via the distributed transmit beamforming.

On the other hand, when the UE 102 transmits data to the AP 104, i.e., uplink data transmission, the AP 104 may estimate the channel between the AP 104 and the UE 102 according to a reference signal transmitted from the UE 102, weigh a received signal from the UE 102 according to the estimated channel, accumulate the weighed signal with the signal transferred from a previous AP, and then transfer the accumulated signal to a next AP, and so on, until the accumulated signal is transferred to the CPU 124. The CPU 124 may demodulate and decode the accumulated signal. For example, the signal transmitted by the $UE_k$ is $s_k$ while the signal that the $AP_n$ receives from $UE_k$ is $y_{nk} = h_{nk} s_k$, where $h_{nk}$ is the channel gain from the antenna of $UE_k$ to $AP_n$. The $AP_n$ may obtain such channel gain by estimating a reference signal of the $UE_k$. The $AP_n$ may weigh the received signal with $h_{nk}^*$, i.e., $h_{nk}^* y_{nk}$, and then accumulate with the signal $$\sum_{j=0}^{n-1} h_{jk}^* y_{jk}$$

transferred from a previous $AP_{n-1}$ to obtain the signal $$\sum_{j=0}^{n} h_{jk}^* y_{jk},$$

which will be transferred to a next AP, and so on, finally the signal that $AP_{N-1}$ transfers to the CPU 124 is $$\sum_{j=0}^{N-1} h_{jk}^* y_{jk} = \sum_{j=0}^{N-1} |h_{jk}|^2 s_k.$$

In terms of the signal $s_k$ transmitted by the $UE_k$, the accumulation of the $AP_0$ through $AP_{N-1}$ are constructive combination, which is also called receive beamforming. More accurately, the distributed APs receive the signal from the UE in a distributed received beamforming.

Aforementioned is the data transmission stage in the cell-free network, the relevant APs respectively have knowledge of the channel gains between a UE and the AP, and thus the signals received from the UE or transmitted to the UE may be combined constructively. In contrast, at the initial access stage, the UE does not even know if it is covered by a cell-free network. The UE can only sense the cell-free network by detecting signals broadcast by the cell-free network. For example, the cell-free network 100 may broadcast the signals through the APs 104. These signals are broadcast at specific time-frequency resources. At the initial access stage, the APs 104 have no idea of the channel gains between the APs 104 and the UE 102. In this case, when the signals broadcast by the APs 104 arrive at the UE 102, it is likely that the signals cannot be combined constructively, and even worse, can be combined destructively, to form a broadcast hole. Consequently, some UEs may fail to obtain the broadcast signal to achieve initial access even if the UEs are geographically close to the APs. If a UE is always located in a broadcast hole, the UE cannot access the cell-free network 100 which is unacceptable. One of the objectives of the present disclosure is to enable the UEs to initially access to the cell-free network.

FIG. 2 illustrates an exemplary implementation 200 for enabling the UEs 102 to initially access the cell-free network 100. The AP 104 may obtain an access assisting signal in an access assisting signal set (210) and broadcast the access assisting signal, for example, to the UEs covered by the AP 104 (220). The access assisting signal set may include G access assisting signals, where G is an integer and G>1. In an implementation, the G access assisting signals may be preconfigured, for example, in a wireless communication protocol between the APs 104 and the UEs 102. Each of the APs 104 may broadcast one or more access assisting signals to the UE 102 within a specific broadcast. The UE 102 may recognize the access assisting signals when receiving them from the APs 104. In an implementation, the AP 104 may coordinate with other APs in the cell-free network 100 to broadcast respective access assisting signals at the same time. The individual APs may broadcast either identical or different access assisting signals at the same time. Alternatively or additionally, the individual APs may broadcast either identical or different number of access assisting signals at the same time.

In some implementations, the AP 104 may obtain the access assisting signal in the access assisting signal set based on at least one of an identifier of the AP 104, the number of times that the AP 104 has broadcast access assisting signals, and a base number generated by the AP 104. The identifier of the AP 104 may include, for example, a device identifier of the AP 104, a physical identifier of the AP 104, a network temporary identifier of the AP 104, and/or the like. The base number may include, for example, a random number, pseudo-random number, a system clock of the AP 104, and/or the like.

In an embodiment, the AP 104 may receive an identification information identifying the access assisting signal in the access assisting signal set from the CPU 124. Alternatively or additionally, the AP 104 may receive the identification information from a base station of a cellular system in wired/wireless communication with the cell-free wireless communication network 100. For example, the identification information may include an index value of the access assisting signal in the access assisting signal set. The CPU 124/the base station may determine and transmit the identification information including the index value to the AP 104. Then, the AP 104 may obtain the access assisting signal in the access assisting signal set with the index value.

Figure 3A:
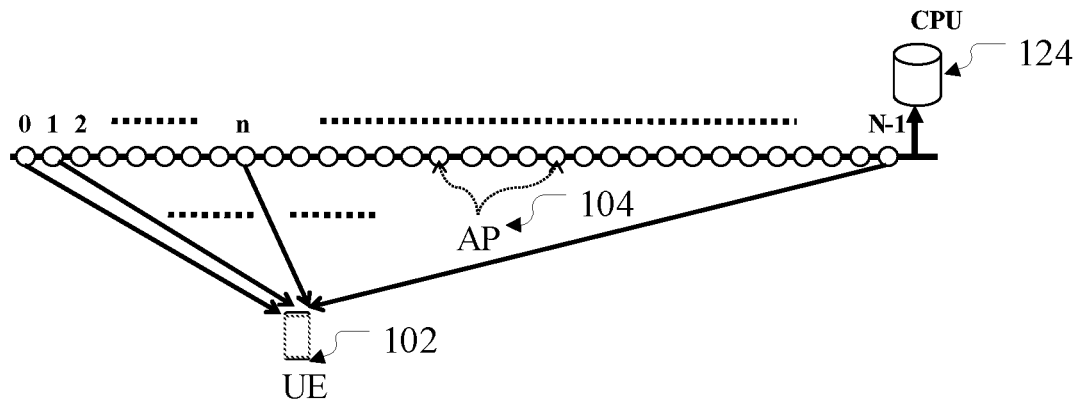
FIG. 3A-3B illustrate examples of obtaining access assisting signals for individual access points in accordance with an embodiment.
Figure 3B:
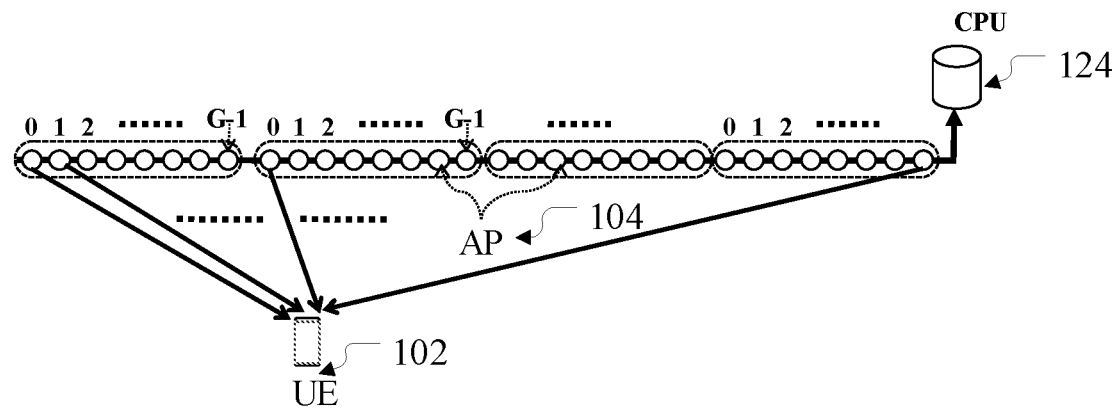

Take the CPU 124 as example, for each of the APs controlled by the CPU 124, the CPU 124 may respectively designate one access assisting signal for broadcasting, for example, based on the identifier of the AP. As illustrated in FIG. 3A, the N APs are numbered with 0, 1, . . . , N−2, N−1 as identifiers of the APs. The G access assisting signals in the access assisting signal set may be indexed with 0, 1, 2, . . . , G−2, G−1. As such, for the nth AP, where 0≤n≤N−1, the CPU 124 may designate an access assisting signal with the index value equal to mod (n, G) to the nth AP. In this way, as illustrated in FIG. 3B, the APs may be divided into multiple groups. Each of the groups has G APs. The G APs in the same group are designated with different access assisting signals while the access assisting signals are repetitive between groups.

The UE 102 may receive multiple different access assisting signals from the NAPs. When the access assisting signals are broadcast in this way, broadcast hole can be formed only when all the access assisting signals are destructively combined, which however may take place with extremely low likelihood. As long as some of the broadcast access assisting signals arrive at the UE 102 without destructive combination, the UE 102 may successfully receive the access assisting signals. Then, the UE 102 may obtain information related to initial access from the access assisting signals and thereby accomplishing the initial access.

Optionally, for a specific AP, the CPU 124 may designate different access assisting signal in each of broadcast, for example, based on the identifier of the AP and the number of times that the AP has broadcast access assisting signals. In an implementation, the N APs are numbered with 0, 1, . . . , N−2, N−1. In the Dth broadcast of the nth AP, the CPU 124 may designate an access assisting signal with the index value equal to f(n,D) for the nth AP, where D is a integer and D≥1. The f(n,D) is a function of n and D and the value of the function will change with the value changes of the parameters n and D.

Figure 4A:
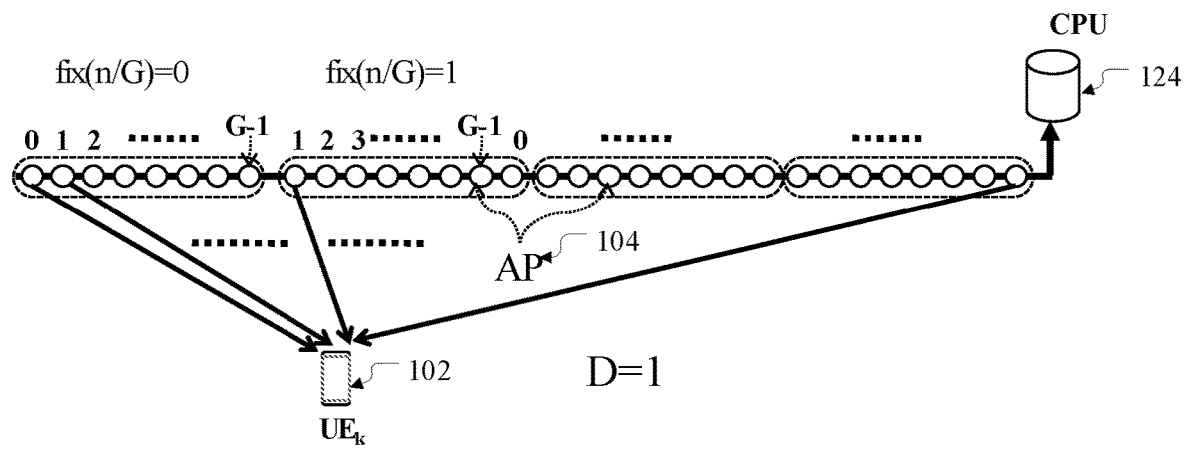
FIG. 4A-4B illustrate examples of obtaining access assisting signals for individual access points in accordance with an embodiment.
Figure 4B:
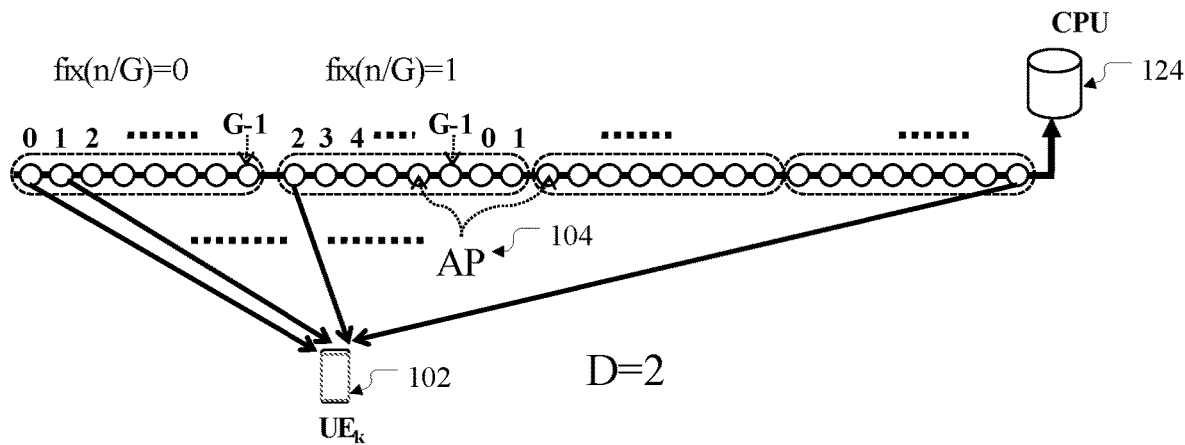

For example, $f(n,D)=\text{mod}(n+\text{fix}(n/G)*D,G)$, where fix(n/G)*D represents a cyclic shift. FIG. 4A shows the access assisting signals designated to the N APs in the first time of broadcasting access assisting signals, i.e., D=1. FIG. 4B shows the access assisting signals designated to the N APs in the second time of broadcasting access assisting signals, i.e., D=2. Including the cyclic shift may further increase the randomness to broadcast access assisting signals. Despite that the UE 102 may be located in a broadcast hole in a specific time of broadcast, the UE 102 may receive access assisting signals in a next time of broadcast due to changes of access assisting signals broadcast by the APs. Because the individual APs may broadcast different access assisting signals in each broadcast and different APs may broadcast different access assisting signals, the likelihood that a UE is located in broadcast hole for consecutively multiple times is very low. This may prevent the UE from being located in broadcast hole for a long time.

Optionally, for a specific AP, the CPU 124 may designate several access assisting signals for the specific AP to broadcast at the same time. That said, an AP may broadcast multiple access assisting signals within a broadcast. Additionally, the individual APs may broadcast different number of access assisting signals within the same time of broadcast. For example, in a specific broadcast, the CPU 124 may designate $W_n$ access assisting signals to the nth AP, i.e., $AP_n$, where $W_n$ is a integer and $W_n \geq 1$. In this way, although some of the $W_n$ access assisting signals broadcast by the $AP_n$ may be destructively combined with access assisting signals broadcast by other APs, the other of the $W_n$ access assisting signals may avoid such destructive combination, or even be constructively combined with access assisting signals broadcast by other APs. This improve the likelihood for the UE to receive the broadcast access assisting signals.

In another embodiment, the identification information received from The CPU 124/the base station may partially identify the target access assisting signal to be broadcast by the AP 104. For example, a predetermined formula used to calculate the index value of the target access assisting signal include two parameters, the first parameter and the second parameter. The identification information may include only the value of the first parameter. As such, the AP 104 may determine the value of the second parameter and then calculate the index value with the value of the first parameter and the value of the second parameter using the predetermined formula. In an example, the AP 104 may determine the value of the second parameter based on the identifier of the AP 104, the number of times that the AP 104 has broadcast access assisting signals, a base number generated by the AP 104, and/or the like.

In another embodiment, instead of receiving the identification information from the CPU 124/the base station, each of the APs may autonomously determine the target access assisting signal to be broadcast by the AP. For example, the AP 104 may determine the index value of the target access assisting signal to be broadcast by the AP 104 based on the identifier of the AP 104, which may be represented as, for example, a number n where n is an integer. The G access assisting signals in the access assisting signal set may be indexed with 0, 1, 2, . . . , G−2, G−1. As such, the AP 104 may determine that the index value to be equal to, for example, mod (n, G).

Alternatively or additionally, the AP 104 may autonomously determine the index value of the target access assisting signal based on the identifier of the AP 104 and the number of times that the AP 104 has broadcast access assisting signals. For example, the N APs are numbered with 0, 1, . . . , N−2, N−1. Where the identifier of the AP 104 is represented as the numbering n of the AP 104, where 0≤n≤N−1 and D represents the number of times that the AP 104 has broadcast access assisting signals, the AP 104 may determine the value of the index value to be equal to f(n,D). The f(n,D) is a function of n and D and the value of the function will change with the value changes of the parameters n and D. As an example, f(n,D)=mod(n+fix(n/G)*D, G), where fix(n/G)*D represents a cyclic shift.

Alternatively or additionally, the AP 104 may autonomously determine the index value of the target access assisting signal based on, for example, a random number r generated by the AP 104. For example, the G access assisting signals in the access assisting signal set may be indexed with 0, 1, 2, . . . , G−2, G−1. The AP 104 may determine the index value to be equal to mod (r, G).

Optionally, the AP 104 may autonomously determine the number of the access assisting signals that the AP 104 may broadcast at the same time in a specific broadcast. The AP 104 may make this determination independently of other APs within the cell-free wireless communication network 100. The AP 104 may determine the number of the access assisting signals based on, for example, the identifier of the AP 104, a base number generated by the AP 104, the number of times that the AP 104 has broadcast access assisting signals, an information received from the CPU 124, an information received from the base station of the cellular system, and/or the like. In an example, the maximum number of access assisting signal that an AP may broadcast in a single broadcast is set to eight. The AP 104 may determine that the number of access assisting signals to be broadcast in a single broadcast is equal to, for example, mod (n, 8)+1 and n may represent the identifier of the AP 104. Alternatively or additionally, the AP 104 may determine to broadcast different number of access assisting signals in individual broadcasts broadcasting access assisting signals.

Alternatively or additionally, the AP 104 may select each of the number of the access assisting signals to be broadcast by the AP 104 independently of each other. For example, the AP 104 may not select one specific access assisting signal simply because the AP 104 has selected another specific access assisting signal. In this way, it may increase the randomness of the access assisting signals to be broadcast by the AP 104 at the same time so as to avoid as much as possible a full collision between access assisting signals broadcast by different APs.

Subsequent to identifying the target access assisting signal to be broadcast by the AP 104 based on, for example, the identifier of the AP 104, a base number generated by the AP 104, the number of times that the AP 104 has broadcast access assisting signals, an information received from the CPU 124, an information received from the base station of the cellular system, and/or the like, as discussed above, the AP 104 may obtain the target access assisting signal based on the identification.

In an embodiment, the access assisting signal set is stored, for example, in a memory 122 of the AP 104 and the target access assisting signal is identified as an index value of target access assisting signal in the access assisting signal set. The AP 104 may directly retrieve the target access assisting signal from the access assisting signal set with the index value.

In another embodiment, the AP 104 may include a sequence generator, for example, implemented as a circuitry. The sequence generator may have the capability to generate each of the access assisting signals in the access assisting signal set. For example, each of the access assisting signals may correspond to respective initial states. The sequence generator may generate the access assisting signal based on the initial state corresponding to the access assisting signal. The initial state may be, for example, a predetermined number or a bit sequence of a given length. Similar to obtaining the index value of the target access assisting signal to be broadcast by the AP 104 as discussed above, the AP 104 may obtain the initial state for the target access assisting signal based on, for example, the identifier of the AP 104, a base number generated by the AP 104, the number of times that the AP 104 has broadcast access assisting signals, an identification information, received from the CPU 124, identifying the target access assisting signal, an identification information, received from the base station of the cellular system, identifying the target access assisting signal, and/or the like.

In an example, the identification information received from the CPU 124 may include the initial state for the target access assisting signal. As such, the AP 104 may input the initial state to the sequence generator, which may then generate and output the target access assisting signal to the AP 104.

Referring to FIG. 2, after obtaining the access assisting signal, the AP 104 may broadcast the access assisting signal. Under the control of the CPU 124, the individual APs may broadcast their respective access assisting signals at a same time. In an implementation, the individual APs 104 may broadcast different number of access assisting signals at the same time. Such broadcast at the same time may increase the likelihood that the UE 102 may receive at least one of the broadcast access assisting signals Optionally, the access assisting signal set may be preconfigured in the cell-free wireless communication network. For example, the cell-free wireless communication wireless may defines that the access assisting signals in the access assisting signal set may occupy a predetermined time frequency resource. The access assisting signals in the access assisting signal set may be multiplexed in the predetermined time frequency resource by, for example, frequency division multiplexing method, time division multiplexing method, and code division multiplexing method. The frequency division multiplexing method may, for example, be orthogonal frequency division multiplexing (OFDM). In an implementation, each of the access assisting signals in the access assisting signal set may occupy one subcarrier of the OFDM waveform in the time frequency resource. Alternatively, each of the access assisting signals in the access assisting signal set may occupy two subcarriers or a small number of subcarriers of the OFDM waveform in the time frequency resource. Alternatively, each of the access assisting signals in the access assisting signal set may occupy a small number of evenly distributed subcarriers of the OFDM waveform in the time frequency resource.

As an example, the access assisting signal set may include G access assisting signals where G>1. The predetermined time frequency resource may be divided into G subchannels or G subcarriers by means of frequency division multiplexing, e.g. orthogonal frequency division multiplexing (OFDM). Each of the G subchannels/subcarriers may respectively carry one of the G access assisting signals. For instance, the predetermined time frequency resource may be divided into eight subchannels/subcarriers by means of orthogonal frequency division multiplexing. Each of the subchannels/subcarriers may respectively carry one access assisting signal. That said, one access assisting signal may be transmitted on an only one subcarrier. As such, the access assisting signal set including eight access assisting signals are formed and an access assisting signal to be broadcast by an access point may occupy a subchannel/subcarrier. The access assisting signal to be broadcast by different access points may occupy the same subchannel/subcarrier or different subchannels/subcarriers.

As another example, the access assisting signal set may include G access assisting signals. By means of frequency division multiplexing and code division multiplexing, the predetermined time frequency resource may be divided into G1 subchannels and each of the G1 subchannels carries Q access assisting signals, where G=G1*Q. Here, the Q signals may be Q sequences. For instance, the predetermined time frequency resource may be divided into eight subchannels and each of the eight subchannels carries eight sequences by means of code division multiplexing. In this way, an access assisting set may be formed including 64 access assisting signals. In this case, an access assisting signal to be broadcast by an access point is a sequence occupying a subchannel. The access assisting signals broadcast by different access points may be at the same subchannel or different subchannels. In the same subchannel, the sequences of the broadcast access assisting signals may be the same or different.

As another example, the access assisting signal set may include G access assisting signals. By means of frequency division multiplexing and time division multiplexing, the predetermined time frequency resource may be divided into G1 subchannels and each of the G1 subchannels carries Q access assisting signals, where G=G1*Q. Here, the Q signals may be Q sequences. In this case, an access assisting signal to be broadcast by an access point is a sequence occupying a subchannel. The access assisting signals broadcast by different access points may be at the same subchannel or different subchannels. In the same subchannel, the sequences of the broadcast access assisting signals may be the same or different.

As another example, the access assisting signal set may include G access assisting signals. The predetermined time frequency resource may be divided into G signals by means of code division multiplexing. In this case, the G signals may be taken as G sequences. As such, the access assisting signal to be broadcast by an access point may be generated based on a sequence. The access assisting signals broadcast by different access points may be generated base on the same sequence or different sequences.

The sequences of the access assisting signals discussed above may include, for example, Zadoff-Chu sequences, Walsh-Hadamard sequences, Discrete Fourier Transform sequences, m sequences, pseudo-noise sequences, Maximum Length Shift Register sequence, and Gold sequences. In an implementation, all access assisting signals in the access assisting signal set are orthogonal to each other. Alternatively or additionally, at least a portion of access assisting signals in the access assisting signal set are non-orthogonal to each other.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The invention claimed is:

1. A method performed by an access point in a cell-free wireless communication network comprising a plurality of access points and at least one central processing unit controlling the access points, comprising:

obtaining an access assisting signal in an access assisting signal set, wherein the access assisting signal set comprises a plurality of access assisting signals that enable a user equipment to initially access to the cell-free wireless communication network, wherein the obtaining the access assisting signal comprises:

obtaining multiple access assisting signals in the access assisting signal, each of the multiple access assisting signals being determined by the access point independently from the access assisting signal; and coordinating with another access point in the plurality of access points to broadcast the access assisting signal obtained by the access point and an access assisting signal obtained by another access point at a same time.

2. The method of claim 1, wherein the obtaining the access assisting signal comprises:

obtaining the access assisting signal in the access assisting signal set based on at least one of:
an identifier of the access point,
a number of times that the access point has broadcast access assisting signals, and
a base number generated by the access point.

3. The method of claim 1, wherein the obtaining the access assisting signal comprises:

receiving an identification information identifying the access assisting signal in the access assisting signal set from a central processing unit controlling the access point or a base station of a cellular system;
obtaining the access assisting signal in the access assisting signal set based on the identification information.

4. The method of claim 3, wherein the obtaining the access assisting signal comprises:

obtaining the access assisting signal in the access assisting signal set based on the identification information and at least one of:
an identifier of the access point,
a number of times that the access point has broadcast access assisting signals, and
a base number generated by the access point.

5. The method of claim 1, wherein the obtaining the access assisting signal comprises:

obtaining the access assisting signal through a sequence generator that is capable of generating each of the access assisting signals in the access assisting signal set.

6. The method of claim 5, wherein the obtaining the access assisting signal comprises:

obtaining the access assisting signal through a sequence generator based on at least one of:
an identifier of the access point,
a number of times that the access point has broadcast access assisting signals,
a base number generated by the access point,
an identification information identifying the access assisting signal received from a central processing unit controlling the access point, and
an identification information identifying the access assisting signal received from a base station of a cellular system.

7. The method of claim 5, wherein the obtaining the access assisting signal comprises:

obtaining an initial state for the sequence generator based on at least one of:
an identifier of the access point,
a number of times that the access point has broadcast access assisting signals,
a base number generated by the access point,
an identification information identifying the access assisting signal received from a central processing unit controlling the access point, and
an identification information identifying the access assisting signal received from a base station of a cellular system; and
obtain the access assisting signal from the sequence generator which generates the access assisting signal based on the initial state.

8. The method of claim 1, wherein the access assisting signal set is stored in the access point and the obtaining the access assisting signal comprises:

obtaining the access assisting signal from the stored access assisting signal set based on at least one of:
an identifier of the access point,
a number of times that the access point has broadcast access assisting signals,
a base number generated by the access point,
an identification information identifying the access assisting signal received from a central processing unit controlling the access point, and
an identification information identifying the access assisting signal received from a base station of a cellular system.

9. The method of claim 1, further comprising:
broadcasting the multiple access assisting signals at a same time.

10. The method of claim 1, further comprising:
determining a number of the multiple access assisting signals based on at least one of:
an identifier of the access point,
a number of times that the access point has broadcast access assisting signals,
a base number generated by the access point,
an information received from a central processing unit, and
an information received from a base station of a cellular system.

11. The method of claim 10, wherein the identifier of the access point comprises:
a device identifier of the access point,
a physical identifier of the access point, or
a network temporary identifier of the access point.

12. The method of claim 1, wherein the access assisting signal set is preconfigured in the cell-free wireless communication network, and the access assisting signals in the access assisting signal set occupy a predetermined time frequency resource.

13. The method of claim 12, wherein the access assisting signals in the access assisting signal set are multiplexed in the predetermined time frequency resource by at least one of:
frequency division multiplexing method,
time division multiplexing method, and
code division multiplexing method.

14. The method of claim 1, wherein each of the access assisting signals in the access assisting signal set occupies a subcarrier of a frequency resource.

15. The method of claim 1, wherein the plurality of access assisting signals comprise at least one of Zadoff-Chu sequences, Walsh-Hadamard sequences, Discrete Fourier Transform sequences, m sequences, pseudo-noise sequences, Maximum Length Shift Register sequence, and Gold sequences.

16. The method of claim 1, wherein the plurality of access assisting signals are orthogonal to each other.

17. The method of claim 1, wherein at least a portion of the plurality of access assisting signals are non-orthogonal to each other.

18. The method of claim 1, wherein at least a portion of the plurality of access points broadcast different number of access assisting signals at the same time.

19. An access point in a cell-free wireless communication network comprising a plurality of access points and at least one central processing unit controlling the access points, the access point comprising:

a memory operable to store computer-readable instructions; and a processor circuitry operable to read the computer-readable instructions, the processor circuitry when executing the computer-readable instructions is configured to:

obtain multiple access assisting signals in an access assisting signal set, wherein the access assisting signal set comprises a plurality of access assisting signals that enable a user equipment to initially access to the cell-free wireless communication network, each of the multiple access assisting signals is determined by the access point independently from the access assisting signal; and coordinate with another access point in the plurality of access points to broadcast one or more of the multiple access assisting signals obtained by the access point and an access assisting signal obtained by another access point at a same time.

* * * * *